(12) United States Patent
Pokrywka

(10) Patent No.: US 7,425,008 B2
(45) Date of Patent: Sep. 16, 2008

(54) STEERABLE LEVERAGED SUSPENSION SYSTEM SUITABLE FOR USE ON A BICYCLE

(76) Inventor: David Frank Pokrywka, 215 Old Polk City Rd., Polk City, FL (US) 33868

( * ) Notice: Subject to any disclaimer, the term of this patent is extended or adjusted under 35 U.S.C. 154(b) by 417 days.

(21) Appl. No.: 11/368,311

(22) Filed: Mar. 6, 2006

(65) Prior Publication Data

US 2007/0222174 A1   Sep. 27, 2007

(51) Int. Cl.
*B62M 1/00* (2006.01)
(52) U.S. Cl. ................................. 280/277; 280/276
(58) Field of Classification Search ............ 280/276, 280/277
See application file for complete search history.

(56) References Cited

U.S. PATENT DOCUMENTS

| 467,794 A | 1/1892 | Ellis |
| 848,324 A | 3/1907 | Sager |
| 929,989 A | 7/1909 | Meiser |
| 953,697 A * | 4/1910 | Kuebodeaux ............... 280/277 |
| 989,638 A | 4/1911 | Pilgrim |
| 1,000,115 A | 8/1911 | Oquist |
| 1,166,156 A | 12/1915 | Shimmin |
| 1,333,449 A | 3/1920 | Russell |
| 1,527,133 A | 2/1925 | Harley |
| 2,976,056 A * | 3/1961 | Henry ......................... 280/277 |
| 3,942,821 A | 3/1976 | Bock |
| 3,954,284 A | 5/1976 | Phillips et al. |
| 4,997,197 A * | 3/1991 | Shultz ........................ 280/275 |
| 6,422,583 B1 * | 7/2002 | Chang ........................ 280/276 |

FOREIGN PATENT DOCUMENTS

| CH | 108178 | 1/1925 |
| DE | 2349159 | 9/1973 |
| GB | 141701 | 8/1920 |

OTHER PUBLICATIONS

Bob Greene and Editors of Motorcyclist Magazine Motorcycle Repair Manual (Revised Edition) Copyright by Petersen publishing. Library Congress Catalog No. 72-85366 p. 237 Trail Measurement / 223 Earls Fork.

* cited by examiner

*Primary Examiner*—Lesley D. Morris
*Assistant Examiner*—Michael R Stabley

(57) ABSTRACT

A steerable leveraged suspension suitable for a bicycle or electric Bicycle of motorized wheel hub design. Comprising of a vertical fork, which attaches to a bicycle frame front neck tube. The lower portion of said vertical fork is curved at its bottom to the rear of the frame neck head tube centerline, so as to improve steering trail geometry. The bottom of the curved fork is a pivot point to which pivot arms are attached. To the pivot arms the front wheel is attached forward of the pivot points by means of slots to which the front wheel Axel shaft fits into. Also two leveraging pivot arm extensions are attached. The leveraging arms provide a means of suspension leverage and a mounting point for brakes. For the purpose of suspension are rubber cord (bungee cord) and a compression damping spring of gas charge type.

3 Claims, 4 Drawing Sheets

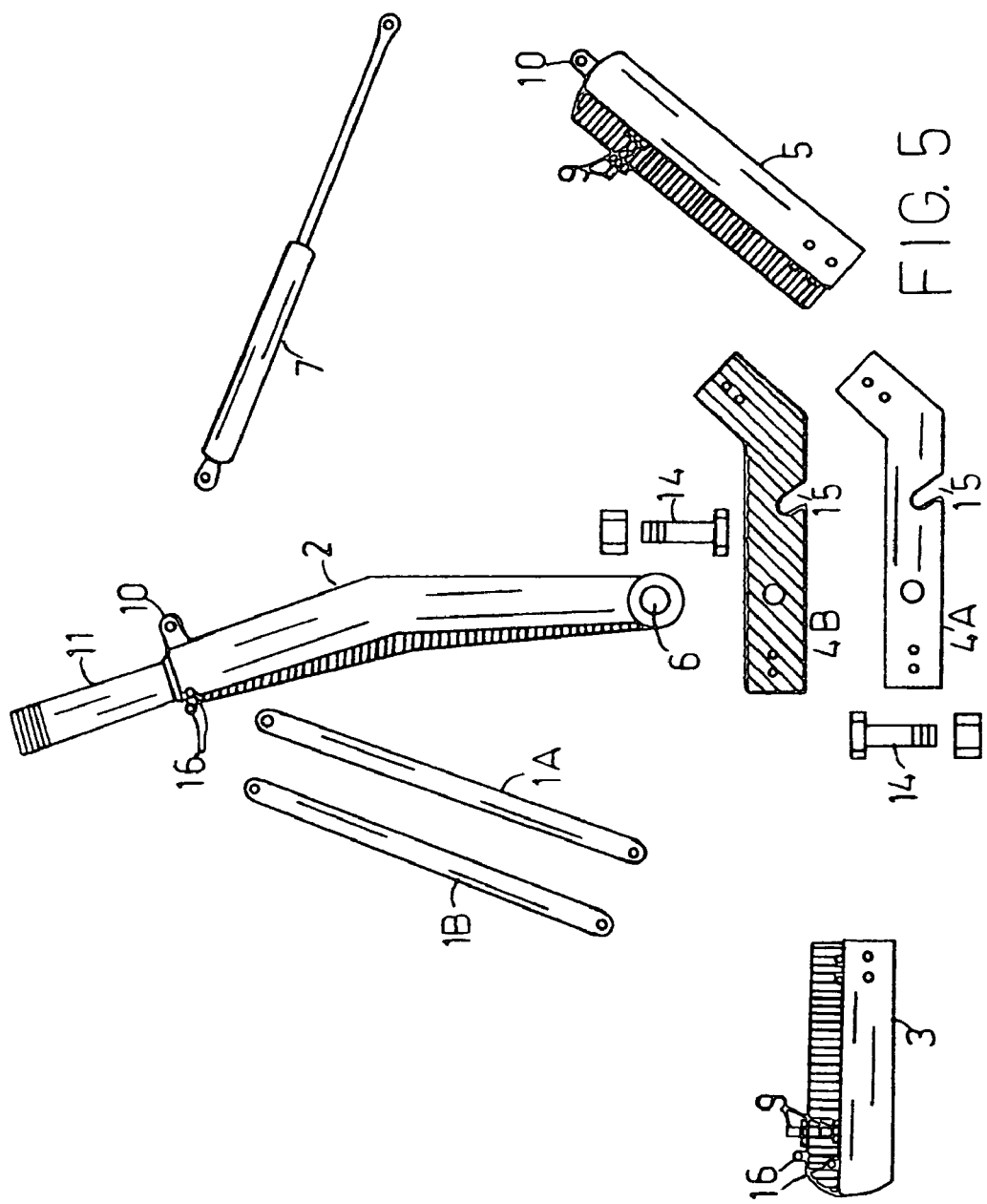

STEERABLE LEVERAGED SUSPENSION SYSTEM SUITABLE FOR USE ON A BICYCLE

BACKGROUND OF INVENTION

The present invention relates to a vehicle steerable suspension system particularly suitable for use on a Bicycle or an Electric powered Bicycle of Motorized Wheel Hub design.

Bicycle suspension systems have been around for well over 100 years going back to the early days of bicycles and continuing on into motorcycles. Some of the first front suspension systems designs being simple and somewhat effective in providing a means of shock absorptions. However some of these early designs did not fully explore the steering geometry in the terms of steering trail as did later or newer designs have utilized.

Many improvements have been made over the years some types have origins beginning with aircraft as with telescopic sliding fork tube type other types have there origins with motorcycles.

Some early designs which have external springs, such as Leading Link or Earls type, Girder type, springer type, to name just a few, some of which are still used on modern day motorcycles. In there present day form some are equipped with hydraulic shock absorbers externally mounted, their spring rates are designed for high speed usage and they do not take full advantage of leverage. Another type of design is the telescopic sliding fork tube type front suspension system, most of this type have internal springs and internal hydraulic shock absorbers, this type as used on modern day motorcycles are very effective at high speed and although tuned differently are quite effective on dirt trails. This same design found on many makes of bicycles today although with limited Travel and no hydraulic damping. They are adequate for there intended purpose, but are difficult To fine tune for differences in rider weights and road conditions.

All of the types of steerable suspension systems suitable for use on bicycles today typically do not make use of leverage in an economical and easily tuneable design.

SUMMARY OF THE INVENTION

In the presented invention of a bicycle steerable suspension, suitable for use on a bicycle or an electric powered bicycle of motorized wheel hub design. Presented is a light weight, low unsprung weight, steerable suspension system which can be made from inexpensive materials preferably steel or aluminum. This steerable suspension system is easily adaptable for different rider weights and various road conditions, such as smooth roads or a bumpy mountain trail. This is accomplished with the use of inexpensive rubber type cords or 'bungee cord' added or removed in varied number to suit road condition or rider weight. Also added a compression type damping spring for higher speed operation (above 30 m.p.h.) preferably gas charged type. The presented bicycle steerable suspension system also permits the use of side mounting rim contacting type brakes, as well as disc type brake systems.

The scope of the invention, a steerable suspension system suitable for use on a bicycle or an electric powered bicycle, which is attached to a standard type bicycle frame, neck head tube. This steerable suspension system comprising a forked section that fits in a vertical plain over the Wheel of which the said vertical fork is curved at its bottom to the rear of the said bicycle frame Neck head tube centerline so as to improve steering trail geometry in a front wheel steering suspension System. The bottom of said vertical fork has pivot bearings on each side of the wheel, these pivot Bearings which can be constructed of a plastic or bronze plain type or needle roller, they are attached to Pivot Arms a left and right by means of a welded on shaft one on each pivot arm and Secured by means of a threaded nut. The front wheel is attached forward of this said pivot point By means of slots to which the wheel Axle is attached by means of threaded nuts. To said pivot arms are attached Pivot Arm extensions, one is attached to the pivot arms to the rear of the pivot points and another is attached forward of the wheel axle, they are attached by means of nut and bolts.

In the presented invention of a steerable suspension system suitable for use on a bicycle or an electric-powered bicycle. The said vertical fork which is attached to a standard type bicycle frame neck tube at its upper portion and at its bottom by means of pivot points attached to pivot arms. The front wheel is attached to the pivot arms by the front wheel axle, to the ends of said pivot arms are attached pivot arm extensions one loops around the rear of the said wheel in a horizontal plain and another loops around the front portion of said front wheel in a plane approximately 45 degree between horizontal and vertical. The said pivot arm extensions loop around said wheel and bolt on each side of wheel to the said pivot arms. To the outer end portion of the said rear pivot arm extension near the circumference of the said wheel and to the upper portion of said vertical fork at a point located below the said bicycle frame neck tube are attached rubber cords (bungee cord)or extension springs for the purpose of a leveraged suspension system and shock absorption. To the outer end portion of the forward pivot arm extension near the said wheel circumference and to the upper portion of the said vertical fork via pivots at each end is attached a compression damping spring, preferable a light weight gas charged type for the purpose of a leveraged damping compression spring and shock absorption.

BRIEF DESCRIPTION OF DRAWINGS

The drawings presented are intended to illustrate, but not limit the invention's potential. The drawings contain four views.

FIG. 5 is a sectional parts view of the steerable leveraged suspension system.

REFERENCE CHARACTERS

Figure 1:
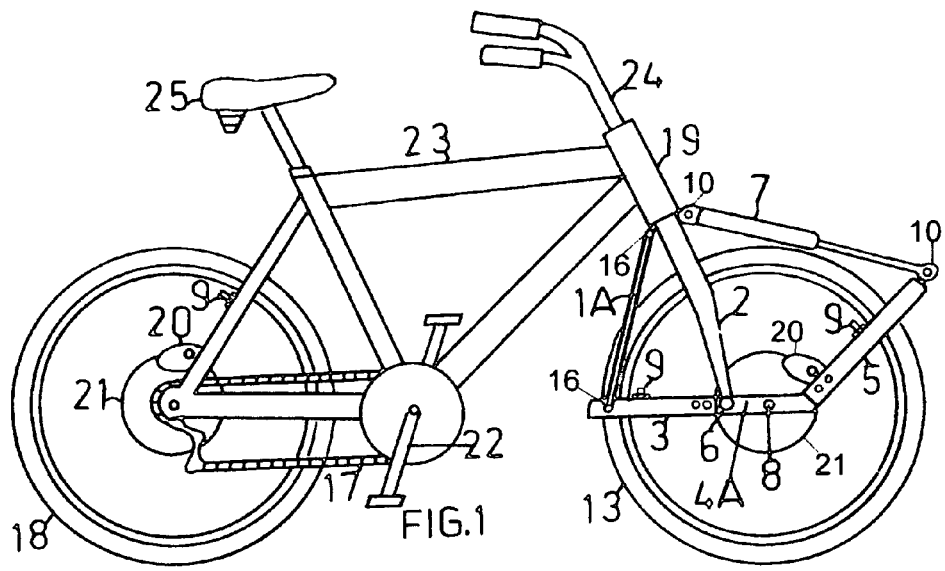
FIG. 1 is a right side view of a bicycle fitted with the steerable leveraged suspension system as would be viewed at rest or being used on a smooth road.

1A, Rubber Cords (right side)
1B, Rubber Cords (left side)
2, Vertical Fork
3, Rear Pivot Arm Extension
4A, Pivot Arm (right side)
4B, Pivot Arm (left side)
5, Forward Pivot Arm Extension
6, Pivot Point
7, Compression type Damper Spring
8, Front Wheel Axle
9, Brake mount
10, Compression spring mount
11, Vertical Fork Neck
12, assembly nuts, bolts
13, Front Wheel
14, Pivot Point Bolts
15, Axle slot
16, extension spring mounts
17, Drive chain, or rubber belt
18, rear wheel
19, Bicycle Frame Neck Tube
20, Disc Brake Caliper
21, Disc, for Disc Brake
22, Peddle Crank
23, Bicycle Frame
24, Handle Bar
25, seat

DETAILED DESCRIPTION OF THE INVENTION

Referring to the drawings of FIG. 1 thru FIG. 5 illustrates the Steerable Leveraged Suspension system as shown in items 1A thru 16. The illustrations are to provide a means of description and are not intended to limit the scope of the present invention.

Figure 2:
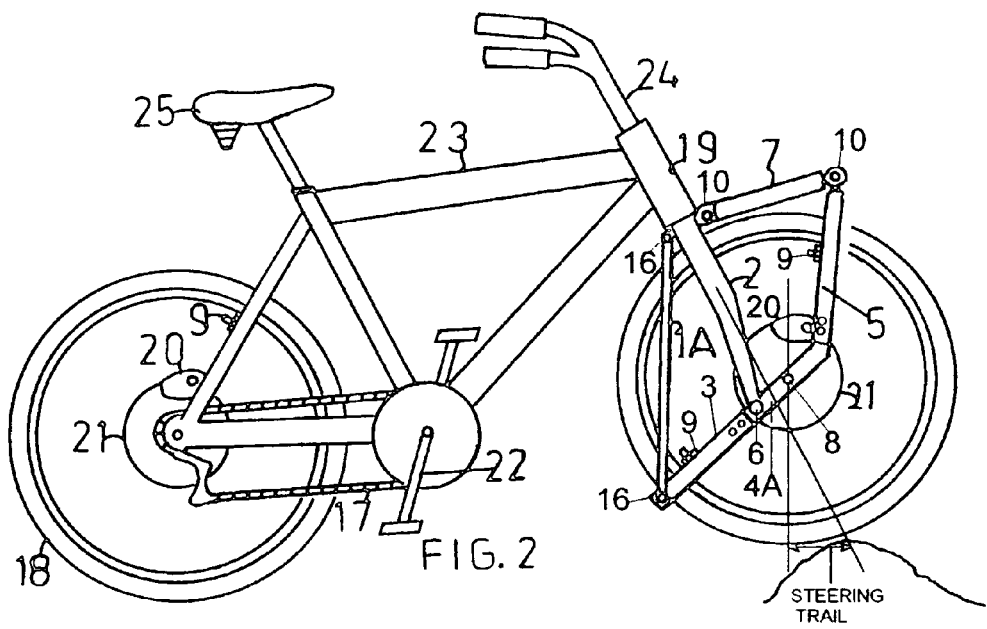
FIG. 2 is a right side view of a bicycle fitted with the steerable leveraged suspension system as would be viewed at full compressed extension or as would be upon contact with a large bump.

Further descriptions in FIG. 2 to one who has knowledge in the art describes the Steerable Leveraged Suspension system, and to simplify understanding it is attached to a bicycle frame 23 to which is attached a rear wheel 18, also shown is a disc brake system caliper 20 and disc 21, a seat 25 crank peddles 22 a chain or toothed belt 17 and handlebars 24.

Figure 3:
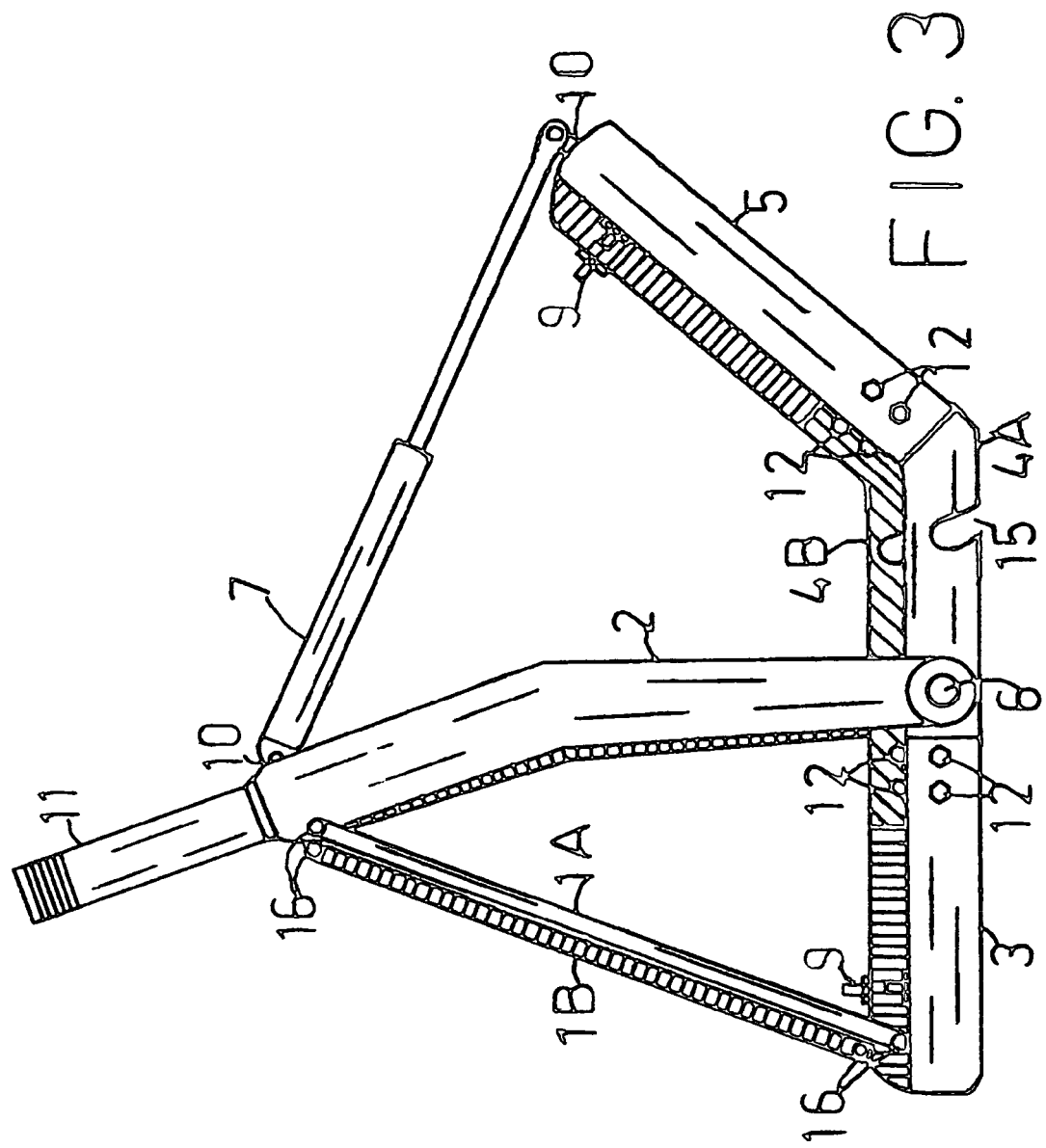
FIG. 3 is a right side view of the steerable leveraged suspension shown without a bicycle frame or front wheel or disc brake mount.
Figure 4:
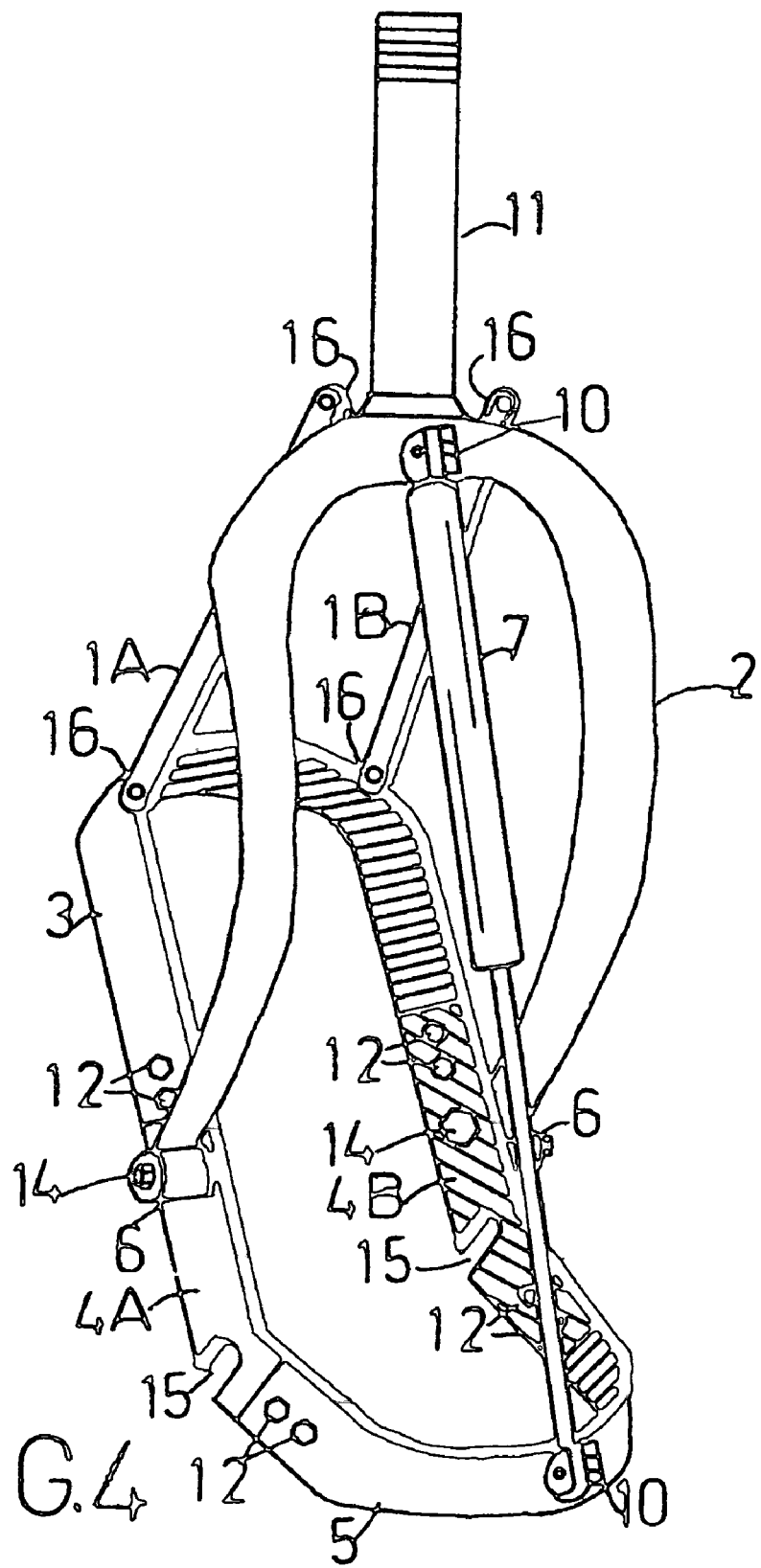
FIG. 4 is a right side frontal view of the steerable leveraged suspension system shown without a bicycle frame or front wheel or brake mounts.

The Steerable Leveraged Suspension system items 1 a thru 16 as viewed in FIG. 2 can be appreciated by one skilled in the art, is attached to the bicycle frame 23 by means of the bicycle frame neck tube 19, FIG. 2 into which fits the vertical fork neck 11, FIG. 3 thru FIG. 5 in typical bicycle fashion via ball bearings (not shown), for the purpose of steering movement. A comparison of illustrations in FIG. 1 and FIG. 2 shows the Steerable Leveraged Suspension system items 1A thru 16 as viewed in FIG. 1 to be at rest or as would be viewed on a smooth road. FIG. 2 shows a comparison of the Steerable Leveraged Suspension system items 1A thru 16 compressed or as would be viewed hitting a large bump.

A description of operation of the Steerable Leveraged Suspension system starts with the weight of the bicycle and rider, which rest upon the vertical fork neck 11 and its bearings (not shown) Which provide for movement in a left to right or side to side plane in a typical bicycle arrangement as one skilled in the art would appreciate, this vertical fork neck 11 and its bearing (not shown) connect to the rest of the bicycle by the frame neck tube 19 FIG. 2, in a manner well known in the art.

The above mentioned vertical fork neck 11 FIG. 3 thru FIG. 5 which is part of the vertical fork 2 is constructed as one piece by means of welding so as to provide strength, the mentioned vertical fork 2 is as its name implies, shaped in a fork manner in that it has two downward legs shown in FIG. 4 at the bottom of each leg is a pivot point 6 which consists of a bearing of which different types could be used such as plain type bronze or plastic or more expensive ball or needle type bearings(not shown), also fitted into the pivot point bearings are pivot point bolts 14 FIG. 4 and FIG. 5.

The described above pivot point bolts 14 in which there are two, one for each leg of the vertical fork 2, are attached to a pivot arm 4 of which there are also two 4A,4B, FIG. 3 thru FIG. 5 a right side and a left side. The pivot point bolts 14 are welded or brazed to the inside of pivot arms 4A and 4B as viewed in FIG. 4 the outer portion of the pivot point bolts 14 are threaded so as to be able to secure the pivot arms 4A and 4B FIG. 4 to the vertical fork 2 by means of a threaded type locking nut, this provides for a removable pivoting connection. With reference to FIG. 1 and FIG. 2 the illustrations show a comparison of the up and down movement of the Steerable Leveraged Suspension system specifically in FIG. 2 which shows pivot point 6 and its bearings (not shown) and with the pivot bolts 14 shown in FIG. 4 and FIG. 5 moving downward and the front wheel axle 8 FIG. 1 and FIG. 2 moving upward as would be the situation having encountered upon an obstacle in the road.

The front wheel Axel 8 FIG. 1 and FIG. 2 is attached to the front wheel 13 FIG. 1 and FIG. 2 by means of bearings (not shown) and the ends of the front wheel axle 8 FIG. 1 and FIG. 2 are threaded, to which a threaded nut is attached (not shown) for the purpose of securing the front wheel as would be well known in the art.

The above mentioned front wheel axle 8 FIG. 1 and FIG. 2 fits into the axle slot 15 FIG. 3 thru FIG. 5 located in pivot arm 4A and 4B FIG. 3 thru FIG. 5 the front wheel axle 8 FIG. 1 and FIG. 2 is threaded at its ends so as to provide a means of securing the front wheel axle 8 FIG. 1 and FIG. 2 into the axle slot 15 FIG. 3 thru FIG. 5 which are located in pivot arms 4A and 4B FIG. 3 thru FIG. 5 and then securing with threaded nuts(not shown) at each end.

The next part of the Steerable Leveraged Suspension system is the rear pivot arm extension 3 which provides a means of leverage, as illustrated it is constructed in the shape of a U and constructed by a steel stamping with ribs or an aluminum casting or a means so as to be of sufficient strength so as to prevent bowing or flexing primarily so that the newer side mounting 9 FIG. 1 and FIG. 2 rim contacting type brakes can be used as can be appreciated by one skilled in the art, also a disc type brake can be used items 20 and 21 FIG. 1 and FIG. 2.

The rear pivot arm extension 3 is attached to the pivot arms 4A and 4B FIG. 3 thru FIG. 4 by assembly nuts and bolts 12 FIG. 4 so as to provide for assembly and disassembly.

The rear pivot arm extension 3 provides for a means of leverage for the suspension system so as to use lighter weight and decreased tensioned extension type springs or as in the illustration drawings using inexpensive rubber cord (bungee cord) 1A and 1B FIG. 3 thru FIG. 5 the number of which being depends primarily on road conditions and rider weight. Two are used on average.

The above mentioned rubber cords 1A and 1B are attached to the rear pivot arm extension 3 and to the vertical fork 2 by means of the extension spring mounts 16 which are loops that are attached by bolting or welding which provide a simple means of attaching rubber cords 1A and 1B for the purpose of providing a sprung leveraged suspended movement or a suspension system.

Further description of the Steerable Leveraged Suspension system is the forward pivot arm extension 5 which provides a means of leverage, as illustrated it is constructed in the shape of a U and constructed by a steel stamping with ribs or an aluminum casting or a means so as to be of sufficient strength as to prevent bowing or flexing primarily so that the newer side mounting 9 FIG. 1 and FIG. 2 rim contacting type brakes can be used as can be appreciated by one skilled in the art, also disc type brakes can be used items 20 and 21 FIG. 1 and FIG. 2.

The forward pivot arm extension 5 provides for a means of leverage for the suspension system so as to use a light weight compression type damping spring 7 gas type preferable, the compression type damping spring 7 aids in damping wheel oscillations when used on bumpy roads at higher speeds.

The mentioned forward pivot arm extension 5 and the vertical fork 2 have a compression spring mount 10, a simple bracket for the purpose of attaching the compression type damping spring 7 between the vertical fork 2 and the forward pivot arm extension 5.

A few other facts to mention about the illustration of the Steerable Leveraged Suspension system 1A thru 16, is the lever and fulcrum effect created by the pivot arm 4A, and 4B FIG. 3 thru FIG. 5 the rear pivot arm extension 3 and the forward pivot arm extension 5 all of which constitutes the lever, the fulcrum point being the front wheel axle 8 FIG. 1 and FIG. 2 being supported against the ground by the front wheel 13 FIG. 1 and FIG. 2, the lever pushing upward against pivot point 6 this amplified levered effect along with the rubber cords 1A AND 1B that create a suspended lever effect along with the compression type damper spring make a very effective and economical suspension system.

Furthermore the bicycle frame neck tube 19 FIG. 1 And FIG. 2 can be set at different angles to facilitate different handling characteristics as can be appreciated by one skilled in the art, an average angle being between 22 and 28 degree. Another note to mention is steering trail it is a measurement taken from the bicycle frame neck tube 19 FIG. 1 and FIG. 2 centerline to the ground and a vertical line from the front wheel axle centerline to ground, the distance between the to lines at ground level is the amount of steering trail as can be appreciated by one skilled in the art. Some of the factors that affect this measurement being the amount of the bicycle frame neck tube 19 FIG. 1 and FIG. 2 angle, the size of the front wheel 13 FIG. 1 and FIG. 2 the length of the vertical fork 2 and the distance between the front wheel axle 8 FIG. 1 and FIG. 2 and the pivot point 6. Test models indicate that 89 mm (3.5") between front wheel axle center 8 FIG. 1 and FIG. 2 and pivot point 6, a bicycle frame neck tube 19 FIG. 1 and FIG. 2 angle of 26 degree a 26" front wheel 13 FIG. 1 and FIG. 2 and front fork 2 of 16" in length will give an approximate at rest steering trail measurement of 4.5" and upon compression approximately 3".

Other facts to mention are that upon application of the brakes either disc type 20 and 21 FIG. 1 and FIG. 2 or rim contacting type (not shown) there is an uplift instead of a dive to the suspension system which is appreciated upon hard braking. Another fact to mention is that this same up lift effect which is desirable, upon acceleration is obtained when an electric hub motor (not shown) is incorporated into the front wheel 13 FIG. 1 and FIG. 2 of the Steerable Leveraged Suspension system 1A thru 16.

Although this invention has been described in the form of a preferred embodiment it should be understood by those skilled in the art, and that the present invention can be expanded beyond the specifically disclosed embodiment and can be used in alternate embodiments and uses, and obvious equivalents or modifications thereof. The invention is intended to be defined by the appended claims.

What is claimed is:

1. A Steerable Leveraged Suspension System suitable for use on a Bicycle or electric powered bicycle, or vehicle of motorized wheel hub design comprising:

A fork section that is positioned in a vertical plain over a wheel of which this vertical fork has a neck section which is attached to a bicycle frame neck head tube, the lower portion of said vertical fork is curved to the rear of the centerline of said bicycle frame neck head tube, the bottom of said vertical fork has two pivot points one on each side of the fork at the bottom;

A pair of pivot arms a left side and a right side, one on each side of said wheel which connects to the said wheel by means of slots to which a wheel axle can be attached, the said vertical fork pivot points attach at the opposite end of said pivot arms;

A rear pivot arm extension, constructed in the shape of a U of which attaches to the right side said pivot arm, to the rear of the pivot point and loops around the said wheel at its rear and attaches to the left side said pivot arm, to the rear of the pivot point;

A forward pivot arm extension, constructed in the shape of a U of which attaches to the right side said pivot arm, to the front of said wheel axle slot, and loops around the said wheel in a plane approximately 45 degree half way between horizontal, and vertical and attaches to the left side pivot arm, to the front of said wheel axle slot.

2. A Steerable Leveraged Suspension system according to claim 1 suitable for use on a bicycle or electric powered bicycle, or a vehicle of motorized wheel hub design further comprising:

Rubber cords (bungee cord) are attached to the outer rear portion of the said rear pivot arm extension, and the other end of said rubber cord are attached to the upper portion of said vertical fork.

3. A Steerable Leveraged Suspension system according to claim 2 suitable for use on a bicycle or electric powered bicycle, or vehicle of motorized wheel hub design further comprising:

A compression damping type shock absorber preferably a gas charged type spring, one end is pivotally attached to the outer portion of said forward pivot arm extension and the other end of said compression damping shock absorber is pivotally attached to the upper portion of said vertical fork.

* * * * *